O. C. TRAVER.
PROTECTION OF PARALLEL FEEDERS.
APPLICATION FILED MAR. 3, 1917.

1,297,936.

Patented Mar. 18, 1919.

Inventor:
Oliver C. Traver,
by Albert G. Davis
His Attorney.

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTION OF PARALLEL FEEDERS.

1,297,936. Specification of Letters Patent. Patented Mar. 18, 1919.

Application filed March 3, 1917. Serial No. 152,298.

*To all whom it may concern:*

Be it known that I, OLIVER C. TRAVER, a citizen of the United States, residing at Schenectady, county of Schenectady, State of New York, have invented certain new and useful Improvements in the Protection of Parallel Feeders, of which the following is a specification.

My invention relates to the protection of parallel feeders and has for its object to provide means for protecting any number of feeders in parallel whereby upon the occurrence of a fault on any of said feeders, the feeder at fault is selected and its circuit opened without disturbing continuity of service on the remaining feeders. A further object of my invention is to provide means applicable to the protection of two parallel feeders whereby the feeder at fault is selectively opened and the one remaining feeder is automatically operative.

Various schemes are known in the art for protecting parallel feeders but these schemes are only operative under limited conditions. Some schemes are applicable to only two parallel feeders, while others are not applicable to less than a certain number of feeders. Furthermore conditions often exist on systems under which the various schemes of protection are inoperative.

In the protective scheme of my application, I have provided a protective means which is applicable to any number of parallel feeders or tie lines to select a feeder at fault under all conditions of trouble without discontinuing service on the remaining feeders and which is operative to automatically protect a system when only one of a plurality of feeders is in service.

Figure 1:
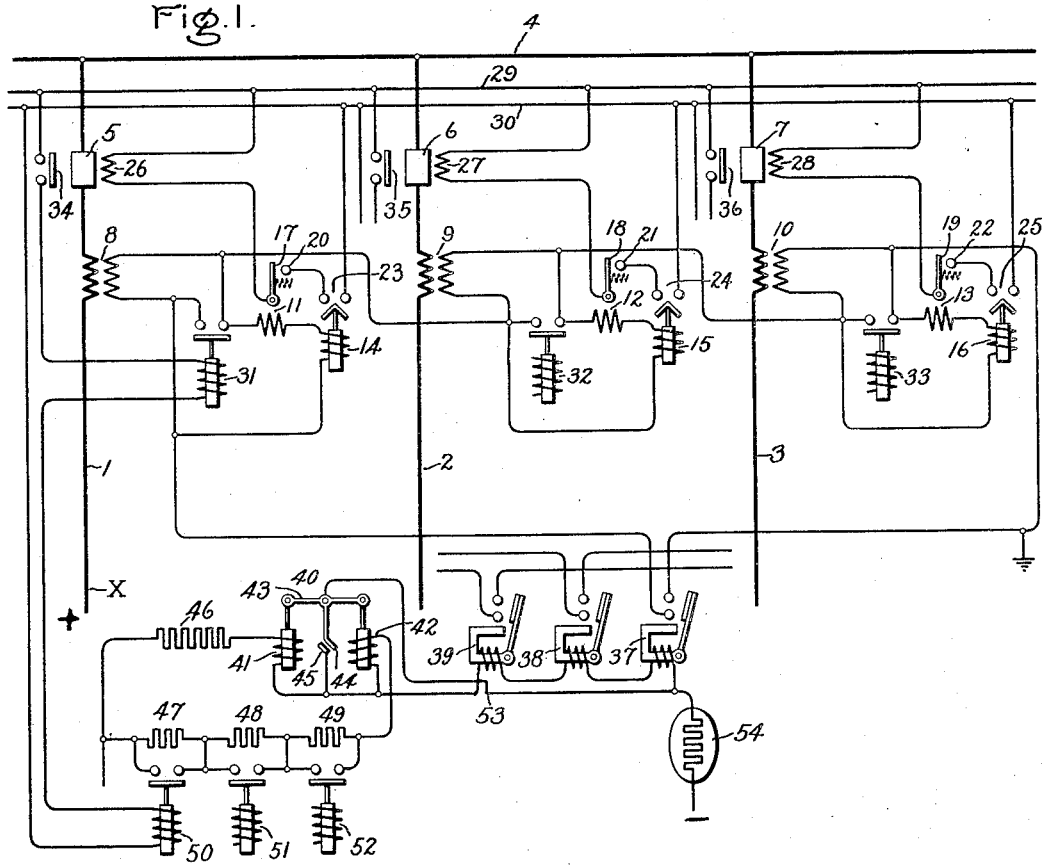
Figure 2:
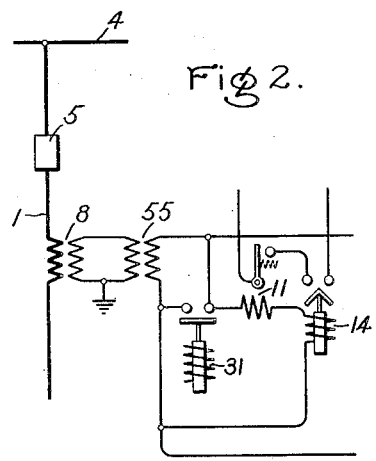

The novel features which I believe to be characteristic of my invention will be definitely indicated in the claims appended hereto, while the features of construction and mode of operation will be understood by reference to the following description taken in connection with the accompanying drawing which shows the preferred embodiment of my invention and in which:

Figure 1 shows diagrammatically my invention embodied in a system comprising a plurality of parallel feeders, and Fig. 2 is a diagrammatic illustration of a portion of the system of Fig. 1 embodying a modified form of my invention.

In Fig. 1 for purposes of clearness, I have shown, in one line diagram, the load or receiving end of a system comprising a plurality of parallel feeders 1, 2, 3 connected to a common bus bar 4 through suitable feeder switches 5, 6, 7, respectively. According to my invention, I connect in each feeder, current transformers 8, 9 and 10, respectively, the secondaries of which are connected in series to form a low resistance loop circuit which is inductively related to all the feeders. By this and other suitable connections, I arrange the secondaries of the transformers in load balancing relation, or in such a manner that the effect of load conditions on the feeders is balanced or canceled out. I have shown only one loop circuit with its connections operatively related to similar phases of the feeders, it is understood that similar loop circuits are operatively related to other similar phases of the feeders which I prefer to connect to ground at one point. Operatively related to the loop circuit shown is a fault responsive means or selective control means for selectively controlling the switches 5, 6 and 7 and hence the circuit of feeders 1, 2 and 3, respectively. This selective control means may be of various forms but what I prefer to use is a control means in a shunt circuit to each of the secondaries of transformers 8, 9 and 10 controlling the switches of corresponding feeders 1, 2 and 3, each control means comprising two electroresponsive devices 11, 12 and 13 and 14, 15, 16, respectively. Devices 11, 12 and 3 are operative in response to relative direction of flow of fault currents, these devices being of the reverse power relay type comprising current and potential windings, but for purposes of clearness, I have omitted the potential windings of these devices as these windings are connected in a manner well known in the art. I have shown, therefore, only the current coils for the devices with their corresponding movable and coöperating fixed contacts 17, 18, 19 and 20, 21. 22, respectively. The control devices 14, 15, 16 are operative in response to fault currents in excess of a predetermined amount and are of the overload relay type operating to close their respective contacts 23, 24 and 25, either instantaneously or after a predetermined time. In the shunt circuits including the electro-responsive devices 11, 12, 13 and 14, 15, 16, respectively, the current coils of the former devices are in series with the current or overload coils of the latter. Furthermore it will be observed that each control means is not only in shunt to its corresponding transformer secondary but is also in shunt to a circuit including all the other control means in series.

The control circuits for the feeder switches 5, 6 and 7 comprise trip coils 26, 27, and 28 respectively, and the contacts of their respective electro-responsive devices 11, 14; 12, 15; and 13, 16 in series thus before any control circuit can be closed both the electro-responsive devices of its controlling means must be in circuit closing position. These control circuits are operative from control buses 29 and 30.

In order to maintain the low resistance of the loop circuit and to effectively maintain the balance of the load currents induced therein from the remaining feeders, when one or more feeders are disconnected, I provide means for short circuiting from the loop circuit the control means and transformer secondary corresponding to a disconnected feeder and completing the loop over the shunted path. I accomplish this purpose by providing short circuiting means or devices 31, 32 and 33 which are normally or in circuit opening position and which are operative in response to the opening of the feeder switches 5, 6, 7 respectively to move into short circuiting position. To obtain this function I prefer to use auxiliary switches 34, 35, 36, respectively, associated with and operatively related to the switches 5, 6 and 7, respectively. The auxiliary switches are closed in response to the opening of their respective switches 5, 6 or 7 and opened in response to the closing of the same. The closing and opening of the auxiliary switches 34, 35 and 36 operate to control their respective short circuiting devices 31, 32, 33 to close or open the short circuit about their corresponding transformer secondaries and control means.

Should circumstances exist when all but one of the feeders are disconnected, I desire to enable this one remaining feeder to open automatically upon a condition of fault and I, therefore, provide a loop circuit controlling means operative to open the loop circuits for the feeders when only one feeder is in service. This loop circuit controlling means comprises contactor devices 37, 38 and 39 each contactor controlling a loop circuit, the loop circuit for contactor 37 being the only one shown in detail. These contactors are controlled by a relay or electro-responsive device 40 of the differential type. As illustrative of such a device, I have shown relay 40 as of the balanced arm construction comprising two windings or coils 41 and 42 operating the lever arm 43 which carries a contact 44 coöperating with a second contact 45. The two coils 41 and 42 of the relay 40 are in parallel circuits, the circuit of coil 41 including a resistance element 46 in series and the circuit of coil 42 including resistance elements 47, 48 and 49 in series corresponding to feeders 1, 2 and 3, respectively. The elements 47, 48 and 49 are of substantially equal resistance and of a value relative to the resistance of element 46 such that the resistance of any two of the elements 47, 48 or 49 is greater than the resistance of element 46 while the resistance of any one of the elements 47, 48 or 49 is less than the resistance of element 46. Each of the resistance elements 47, 48 and 49 is adapted to be short circuited by the operation of relays 50, 51 and 52, respectively, these relays being in series with the short circuiting relays 31, 32 and 33, respectively, and operated simultaneously therewith in response to actuation of the auxiliary switches 34, 35, 36, respectively. Instead of the resistance element 46, it is understood that I may balance the resistance of the circuit of coil 42 against the resistance of the coil 41 itself.

As long as coil 41 of the relay is stronger, that is as long as two or more of the resistance elements 47, 48 and 49 are in series or in other words, as long as two or more feeders are in service, the contacts 44 and 45 of the relay 40 remain open and the current from the two parallel circuits combines, after passing through the relay, the total current flowing through the contactors 37, 38 and 39 and thence to the negative control bus. All of the contactors are thereby energized to maintain their respective loop circuits closed. When, however, coil 42 of the relay overpowers coil 41, due to the short circuiting of all but one of the elements 47, 48 or 49, caused by the disconnection of all but one of the feeders, the relay contacts 44 and 45 are closed and a circuit is completed along conductor 53 to the negative source of current which acts to short circuit the contactors 37, 38, 39 and cause them to open their respective loop circuits. A current limiting means such as a ballistic resistance 54 is connected between the conductor 53, the contactor circuit and the negative source of current to maintain the current through the parallel circuits of relay 40 as nearly constant as possible and permit the operation of the device over wide ranges of operating voltage.

The operation of my protective means may be described as follows. In Fig. 1 under normal conditions with the three feeders 1, 2 and 3 in service, switches 5, 6 and 7 are of course closed and correspondingly auxiliary switches 34, 35 and 36 are open. As the secondaries of transformers 8, 9 and 10 are of substantially the same impedance and are connected in series to form a loop circuit, the load currents induced in the loop circuit are balanced and their effect is balanced out. Under normal conditions the balanced load current flows around the loop, through the secondaries of transformers 8, 9 and 10 as the shunt paths through the control means are of too high impedance. The loop circuit therefore renders the selective control means unresponsive to load currents and responsive only to fault currents. As the effect of load currents is balanced out the control means operate under conditions similar to those of no load. As auxiliary switches 34, 35 and 36 are open, the control circuits of relay devices 31, 32 and 33 and 50, 51 and 52 respectively, are deënergized and these relays are in circuit opening position. In the loop circuit controlling means, therefore, the resistance elements 47, 48 and 49 are in series and as the resistance of these elements is greater than the resistance of element 46, the current from the positive control bus will flow mostly through the circuit including element 46 and coil 41. Coil 41, therefore, overpowers coil 42 and the relay 40 is operated to maintain its contacts 44 and 45 open. The current flowing through the circuit of coil 41 combines with the smaller current through the parallel circuit including coil 42 and the combined current then flows through the contactors 37, 38 and 39 in series and then through the ballistic resistance 54 to the negative source of control. The contactors are, therefore, operative to maintain their loop circuits closed.

Let us assume that bus 4 is at a receiving station and a fault occurs on one feeder, feeder 1 for instance, as at X. Dependent on the character of the fault and the conditions on the system, an increased current flows in the healthy feeders 2 and 3 which increase is due to the fault and is considered a fault current on each feeder. The fault currents from each of the healthy feeders combine and flow out the faulty feeder 1 to the fault. The direction of power on feeders 2 and 3 is unchanged and the direction of power at the end of the feeder 1 may or may not be reversed depending on the relation of the fault current to the load or power current. Irrespective of whether a reversal takes place on the faulty feeder or not, fault currents induced in the secondaries of transformers 9 and 10 from feeders 2 and 3 flow through the shunt circuits including their respective selective control means. A fault current which is the sum of the fault currents flowing in feeders 2 and 3 flows out feeder 1 to the fault and thereby induces a fault current of, in this instance, twice the amount of feeders 2 or 3, in the secondary of transformer 8 which flows through the shunt circuit including its control means in a direction opposite to the flow of current in the control means corresponding to the transformers 9 and 10. Due to the fact that the control means for feeder 1 is in shunt to the control means for feeders 2 and 3 in series, two-thirds of the fault current flowing in the loop circuit passes through the control means of feeder 1 and one-third of the fault current flows through the control means of feeders 2 and 3. The flow of current through the control relay 11 of the feeder 1 is in a direction to close its contacts 17 and 20 while the direction of flow through the control relays 12 and 13 corresponding to feeders 2 and 3 is in a direction to maintain their contacts open. The fault current also acts to energize relay 14 for feeder 1 and it closes its contacts 23. Depending on the value of the fault currents passing through the control means of feeders 2 and 3 their control relays 15 and 16 may or may not close but as their corresponding control relays 12 and 13 are in circuit opening position, the control circuits for their switches 6 and 7 remain open. On the faulty feeder, however, the contacts of both relays 11 and 14 are closed and the control circuit for switch 5 is completed, the trip coil 26 being energized and the switch 5 automatically opened. When feeder switch 5 opens, its auxiliary switch 34 closes the control circuit including the relays 31 and 50 corresponding to feeder 1. Relay 31 operates to short circuit both the transformer secondary 8 and its control means from the loop circuit to maintain the low resistance of the loop circuit and also to maintain the load currents corresponding to the remaining feeders in balanced condition. In a similar maner relay 50 closes and short circuits resistance element 47 corresponding to feeder 1. The relay 40 of the loop controlling means remains, however, in open position as the coil 41 still overpowers coil 42, the resistance of the circuit of coil 42 including the resistance elements 48 and 49 being greater than the resistance of the circuit of coil 41 including the element 46. When switch 5 is closed to put feeder 1 in service again, auxiliary switch 34 opens to cause relay 31 to open its short circuit and include its transformer secondary and control means in the loop circuit again and relay 50 opens to include the resistance element 47 in circuit.

By the use of the control means described, I am able to prevent the opening of feeders on slight and unobjectionable reversals of power as the fault current may be in a direction to operate the reverse power device corresponding to the faulty feeder but the trip circuit is not completed due to the fact that the current is not sufficient to operate the corresponding overload relay. Again, trouble may occur on a feeder of a network beyond the bus 1 causing a heavy fault current on all the feeders 1, 2 and 3. Due to the fact that his fault current is in the same direction in all the feeders its effect in the loop circuit is balanced out and the control means do not operate.

Let us assume, however, that before feeder 1 is connected to the system and with only two feeders 2 and 3 remaining in service, that a fault occurs on another feeder, feeder 2 for instance. In a manner similar to that described, the fault current on the healthy feeder 3 operates the overload relay 16 of its control means but this current is in a direction such that its relay 13 is not operated and the control means for this feeder is, therefore, inoperative to complete the circuit of trip coil 28. On feeder 2, however, the fault current from feeder 3 flows out feeder 2 to the fault inducing a fault current in its transformer secondary 9 which is equal to the fault current of feeder 3 but flows in the opposite direction through the control means of feeder 2 causing thereby not only an operation of its relay 15 but also of its relay 12. The contacts of these relays are thereby closed and the control circuit is completed to energize trip coil 27 and cause the opening of the switch 6 with a consequent closing of auxiliary switch 35. The closing of switch 35 causes relay 32 to short circuit the secondary of transformer 9 and the corresponding control means including relays 12 and 15 to thereby complete the loop circuit, while at the same time relay 51 operates to short circuit the resistance element 48 corresponding to feeder 2. With the resistance elements 47 and 48 short circuited, only resistance element 49 remains in series with coil 42 of the relay 40 and as the resistance of this path is less than the parallel path through the element 46 and coil 41, more current will flow through the circuit of coil 42 and it will overpower coil 41 and actuate the relay 40 to close its contacts 44 and 45. When these contacts are closed a circuit is completed along conductor 53 in shunt to the contactors 37, 38, 39 most of the current passing along conductor 53 to the negative source of current. As the relay 40, therefore, closes its contacts 44 and 45, the contactors 37, 38 and 39 are short circuited and open their respective loop circuits. This loop circuit controlling means is thereby held inoperative until all but one feeder has been disconnected whereupon it then operates to open the loop circuits. The opening of the loop circuits with only one feeder in service acts to render the opening of the last feeder automatic as with feeders 1 and 2 open and their short circuiting relays 31 and 32, respectively closed, if the loop circuits were also closed, a short circuit would exist across the transformer secondary 10 and its control means in the same manner as if its relay 33 were closed. The last feeder could not then be opened automatically. To overcome this difficulty, my loop controlling device operates to open the loop circuits when all but one of several feeders are opened, to overcome this short circuited condition which would otherwise exist. With the loop circuits open by contactors 37, 38, and 39, the one remaining feeder 3 acts merely with its control device in shunt to its transformer secondary 10 the device operating upon the occurrence of a fault causing both reversal of power and overload, to open the feeder as has been heretofore described.

In Fig. 2 I have shown a modified arrangement of my protective scheme in which only one feeder 1 of the system of Fig. 1 is shown, it being understood that the remaining feeders of the system are similarly connected. In the modification of Fig. 2, I connect the secondaries of my transformers 8, 9 and 10 to the primaries of auxiliary transformers, the secondaries of which are connected in series to form the loop circuit. In Fig. 2, I have shown auxiliary transformer 55 so connected to transformer 8 with the control device and short circuiting relay operatively related thereto as in Fig. 1. The auxiliary transformers are arranged to saturate at small overload values and thus limit the current which can be taken by their control devices. There is also an advantage in using auxiliary transformers in that the individual current transformers 8, 9 and 10 can be independently grounded whereas in the scheme of Fig. 1 the loop circuits only can be grounded.

I have thus devised a scheme of protection which is applicable to any number of feeders and is operative to automatically open the circuit of the feeder at fault from any number in parallel to the condition where only one feeder of a plurality remains in circuit and by my novel control means, the feeder at fault is selected and its circuit opened without discontinuing service on the remaining feeders. While I have shown my protective means applied to the substation or load end of a system of parallel feeders it is understood that where conditions are such to demand it, my protective means may be similarly applied at the generator end of the system.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In combination with a plurality of parallel feeders, transformers operatively related to said feeders, a loop circuit including the secondaries of said transformers in series, a separate shunt circuit to each of said secondaries, fault responsive means in each of said shunt circuits selectively operative in response to current therein of a predetermined amount and in a predetermined direction, each of said fault responsive means comprising two separate electroresponsive devices in series, and a trip circuit controlled by each of said fault responsive means adapted to be energized when its respective electroresponsive devices are both in circuit closing position.

2. In combination with a plurality of parallel feeders, transformers operatively related to said feeders, a loop circuit including the secondaries of said transformer in series, a separate shunt circuit to each of said secondaries, an electroresponsive device in each shunt circuit responsive to relative direction of current flow in each circuit, a second electroresponsive device in each shunt circuit responsive to current flow therein above a predetermined amount, switches for each of said feeders, and trip circuits therefor adapted to be energized when both its respective electroresponsive devices are in circuit closing position.

3. In combination with a plurality of parallel feeders, switches controlling said feeders, transformers operatively related to said feeders, a loop circuit including the secondaries of said transformers in load balancing relation, separate fault responsive means in shunt to each of said secondaries inoperative in response to balanced currents in said loop circuit but selectively operative in response to fault currents therein above a predetermined amount and in a predetermined direction, and means operative in response to the opening of any of said feeders for balancing the load currents in said loop corresponding to the remaining feeders.

4. In combination with three or more parallel feeders, transformers operatively related to said feeders, a loop circuit including the secondaries of said transformers in series, switches for said feeders, trip circuits therefor, a separate circuit in shunt to each of said secondaries, means for selectively closing any of said circuits in response to current in said shunt circuits comprising two electroresponsive devices, one device responsive to relative direction of current flow in its shunt circuit, and the other device operative in response to current above a predetermined amount in its shunt circuit.

5. In combination with a plurality of parallel feeders, transformers operatively related to each feeder, a circuit including the secondaries of said transformers connected so that their load currents are balanced, a separate circuit in shunt to each transformer secondary, two separate electroresponsive devices in each shunt circuit, switches for said feeders, trip circuits for each of said switches adapted to be closed when both said corresponding electroresponsive devices are closed, and means for shunting each of said secondaries and corresponding electroresponsive means in response to the opening of their corresponding feeder.

6. In combination with a plurality of parallel feeders, means for selectively opening any of said feeders in response to a fault thereon comprising a loop circuit, transformers operatively related to each feeder having their secondaries connected in said loop circuit, control means in shunt to said secondaries operative in response to fault currents in said loop for selectively opening the circuit of the feeder at fault, and means operative in response to the opening of all but one of said feeders for rendering the opening of said one remaining feeder automatic.

7. In combination with a plurality of parallel feeders, transformers operatively related to each of said feeders, a loop circuit including the secondaries of said transformers in series, means in shunt to each of said secondaries for controlling the opening of their corresponding feeders, means operative in response to the opening of each feeder for short circuiting its corresponding secondary and control means, and loop circuit control means operative to maintain said loop circuit closed as long as more than one feeder is in service but to open said loop circuit when one feeder only is in service.

8. In combination with a plurality of parallel feeders, transformers connected to each feeder, a loop circuit including the secondaries of said transformers in series, control means in shunt to said secondaries for selectively opening the circuits of said feeders automatically in response to fault currents in said circuit, means responsive to the opening of the circuits of any of said feeders for shunting from the loop circuit the secondary and control means corresponding to the feeder opened, and means responsive to the opening of all but one of said plurality of feeders for rendering the control means of said one remaining feeder automatically operative.

9. In combination with a plurality of parallel feeders, transformers connected to said feeders, auxiliary transformers operatively related thereto having secondaries adapted to be saturated, a loop circuit including the secondaries of said auxiliary transformers in series, control means for each feeder in shunt to said secondaries, means for short circuiting each secondary and control means in response to the opening of their corresponding feeder, and differential control means for normally maintaining said loop circuit closed when two or more feeders are in service and for opening said loop circuit when only one feeder is in service.

In witness whereof, I have hereunto set my hand this 1st day of March, 1917.

OLIVER C. TRAVER.